United States Patent
Moesle

(10) Patent No.: US 8,456,570 B2
(45) Date of Patent: Jun. 4, 2013

(54) MOTION DETECTION IN AN INTERLACED FIELD SEQUENCE

(75) Inventor: Frank Moesle, Stuttgart (DE)

(73) Assignee: Sony Deutschland GmbH, Berlin (DE)

( * ) Notice: Subject to any disclaimer, the term of this patent is extended or adjusted under 35 U.S.C. 154(b) by 1611 days.

(21) Appl. No.: 11/691,646

(22) Filed: Mar. 27, 2007

(65) Prior Publication Data

US 2007/0236604 A1    Oct. 11, 2007

(30) Foreign Application Priority Data

Mar. 29, 2006   (EP) ..................................... 06006569

(51) Int. Cl.
*H04N 7/01*   (2006.01)

(52) U.S. Cl.
USPC ........... 348/441; 348/452; 348/558; 348/458; 348/448; 348/701; 348/607; 382/300

(58) Field of Classification Search
USPC ................................. 348/452, 701
See application file for complete search history.

(56) References Cited

U.S. PATENT DOCUMENTS

| | | | | |
|---|---|---|---|---|
| 5,291,280 A * | 3/1994 | Faroudja et al. | ......... | 375/240.12 |
| 5,832,143 A * | 11/1998 | Suga et al. | ..................... | 382/300 |
| 7,075,988 B2 * | 7/2006 | Lee et al. | ..................... | 348/459 |
| 7,262,806 B2 * | 8/2007 | MacInnis et al. | ............. | 348/441 |

FOREIGN PATENT DOCUMENTS

| | | |
|---|---|---|
| EP | 0 242 935 A1 | 10/1987 |
| WO | WO 93/05616 | 3/1993 |
| WO | WO 00/27109 | 5/2000 |
| WO | WO 00/27109 A1 * | 5/2000 |
| WO | WO 00/27109 A1 * | 5/2000 |
| WO | WO 0027109 A1 * | 5/2000 |

* cited by examiner

*Primary Examiner* — Jefferey Harold
*Assistant Examiner* — Omer Khalid
(74) *Attorney, Agent, or Firm* — Oblon, Spivak, McClelland, Maier & Neustadt, L.L.P.

(57) ABSTRACT

A method for a motion detection in an interlaced field sequence includes selecting two initial fields from the interlaced field sequence. Each of the two initial fields have different scan lines. The method also includes interpolating each of the two initial fields to generate two respective new fields. The new fields have raster lines that are congruent. The method further includes generating a value of a pixel of each new field using pixel values of at least two scan lines of a corresponding initial field surrounding the pixel. Further, the method includes performing a motion detection based on the new fields.

39 Claims, 4 Drawing Sheets

MOTION DETECTION IN AN INTERLACED FIELD SEQUENCE

BACKGROUND

Figure 1:
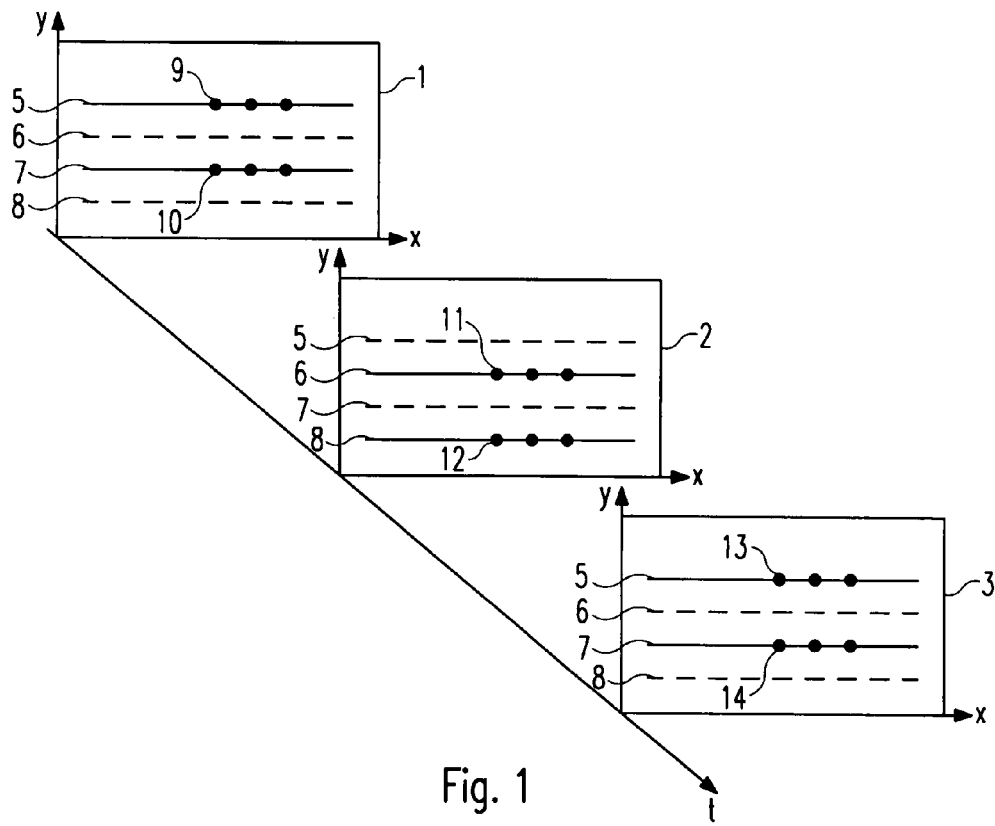

The present invention generally relates to the field of interlaced video-material, and particularly to a method and a system for performing motion detection in an interlaced video sequence.

In terms of its structure, a video sequence can be classified into two types that are progressive scan video sequence and interlaced scan video sequence. A progressive scan video sequence is composed of a series of frames, wherein the lines of each frame are drawn in sequence, i.e. a frame in the sequence is refreshed sequentially line by line from the top to the button of the frame. In such progressive scan video sequences, a motion detection can be performed by comparing in a known manner the lines, pixels, or blocks of pixels of successive frames.

On the other hand, an interlaced scan video sequence is composed of a series of images that are referred to as fields. Fields are similar to frames but have only half the vertical resolution thereof and are generally displayed twice as fast. In fact, interlaced scanning halves the number of scan lines in each field of the image sequence, thereby discarding half the information necessary to define each image in the vertical direction fully. For example, all European television pictures or frames are composed of 575 scan lines. However, each frame is transmitted as two separate fields of 287 or 288 lines, one so-called odd field consisting of the odd-numbered lines and the following so-called even field comprising the even-numbered lines.

Several methods are known from the prior art for performing a motion detection in such an interlaced video material. One approach consists in using two consecutive fields of different raster, namely an even field and an odd field. The motion detection itself is done by comparing the pixel values of the two consecutive fields within a given area of the fields. However, this method does not enable an exact detection of moving areas or pixels because the two consecutive fields are defined by distinct scan lines and thus by distinct pixels.

According to an alternative approach, it is known to use two consecutive fields of the same type like two consecutive even fields or two consecutive odd fields. A motion detection can be achieved by calculating within the same area the absolute difference between the pixel values of the two selected fields. The absolute differences of each pixel in the area are then summed and compared to a predetermined threshold. For values below said threshold, it is assumed that there is a motion, while for values above said threshold, it is assumed that the area is static.

However, as the two selected consecutive fields of the same type are separated by a field of the other type, some movements occurring between the two selected fields may be ignored and considered as static, especially around the contours of an object. Additionally, in order to perform a continuous motion detection it is necessary to store three successive fields, such that more video memory is required.

Another alternative known approach for detecting movements in a video sequence combines the two above approaches and compares the content of three successive fields in time: one field of a given type encompassed by two fields of the other type. This so-called three-field technique is nevertheless more complicated, requires more video memory, and misdetection may still exist.

BRIEF SUMMARY

It is in view of the above therefore an object of the present invention to provide for a simple, reliable and efficient motion detection technique.

The solution of the invention consists in selecting two fields of different type and interpolating the two fields to a common line structure or raster position. Alternatively, only one field is interpolated to the line structure of the other field.

Here are some advantages resulting from the idea of the invention:

As only two fields need to be selected and processed, the requirements for video memory for storing the fields and interpolating them are kept small.

The two selected fields can be advantageously two successive fields of the video sequence, such that there is no need for additional storage units for temporarily storing additional fields as is the case for the prior art approach using two consecutive fields of the same type.

As the generated fields are defined by a common or congruent line structure, pixels or field elements having the same position in the line structure can be directly and easily compared to one another.

As the comparison of a predefined area of the generated fields bases on a common line structure thereof, it is possible to perform a reliable motion detection.

According to a first aspect of the invention, a method for motion detection in an interlaced field sequence is proposed. The method comprising the steps of selecting at least two initial fields from the interlaced field sequence, said initial fields having different scan lines, interpolating each of said two initial fields to generate respective new fields, said new fields having raster lines that are congruent, and performing a motion detection on the basis of the new fields.

According to a further aspect of the invention, a method for motion detection in an interlaced field sequence is proposed, comprising selecting at least two initial fields from the interlaced field sequence, said initial fields having different scan lines, generating at least two new fields, wherein one new field is generated using one initial field and the other new field is generated by interpolating the other initial field, and wherein said new fields have raster lines that are congruent, and performing a motion detection on the basis of the new fields.

Particularly, the initial fields can be two consecutive fields of the interlaced field sequence.

Further the number of raster lines of said new fields can be at least equal to the number of scan lines of said initial fields.

The raster lines can correspond to a vertical translation of the scan lines.

Favorably, the raster lines are obtained by shifting up the scan lines of one initial field by a quarter of the distance between two scan lines and by shifting down the scan lines of the other initial field by a quarter of said distance between two scan lines.

The value of a pixel of each new field can be generated using the pixel values of at least the two scan lines of the corresponding initial field surrounding said pixel.

Further the interpolation can be a linear interpolation.

Particularly motion detection can be performed by comparing a same area of said new fields.

Additionally the method may comprise the steps of calculating, for each pixel of the area, the difference between the pixel value of said new fields, generating a motion parameter by adding said difference calculated for all pixels of the area, and determining a motion detection on the basis of the motion parameter.

The motion parameter can be thereby compared to a predetermined threshold.

Further the initial fields can be filtered.

According to a further aspect of the invention, it is proposed a computer program product adapted to implement a method described above when run in a computing system.

According to a further aspect of the invention, it is proposed to use said method for motion detection in a video compression method and/or in a method for displaying video.

According to a still further aspect of the invention, a system for motion detection in an interlaced field sequence is proposed. Said system comprises selecting means for selecting at least two initial fields from the interlaced field sequence, said initial fields having different scan lines, interpolating means for generating respective new fields on the basis of each of said two initial fields, said new fields having raster lines that are congruent, and motion detection means for performing a motion detection on the basis of the new fields.

According to a further aspect of the invention, a system for motion detection in an interlaced field sequence comprises selecting means for selecting at least two initial fields from the interlaced field sequence, said initial fields having different scan lines, means for generating at least two new fields, wherein one new field is generated using one initial field and the other new field is generated by interpolating the other initial field, and wherein said new fields have raster lines that are congruent, and motion detection means for performing a motion detection on the basis of the new fields.

It has to be noted that the various elements of the invention which are referred to as means and the corresponding functionality can be implemented with any kind of respective device, unit, software of hardware elements and parts thereof as well as any other suitable implementation not explicitly mentioned here.

BRIEF DESCRIPTON OF THE DRAWINGS

Figure 2:
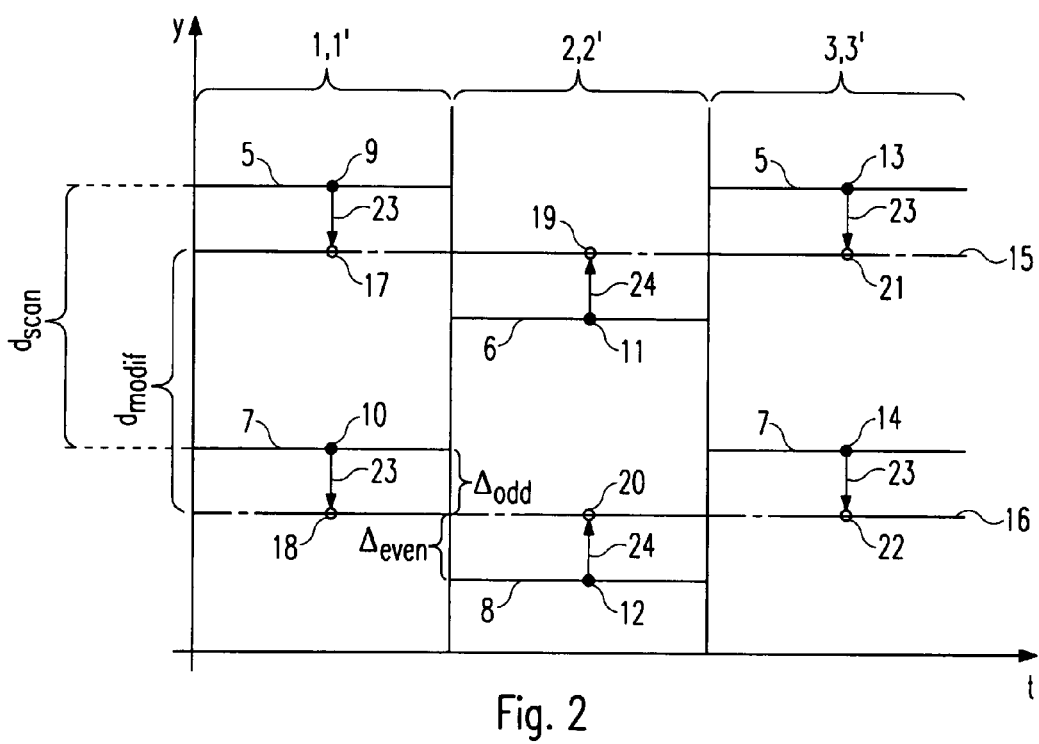
Figure 3:
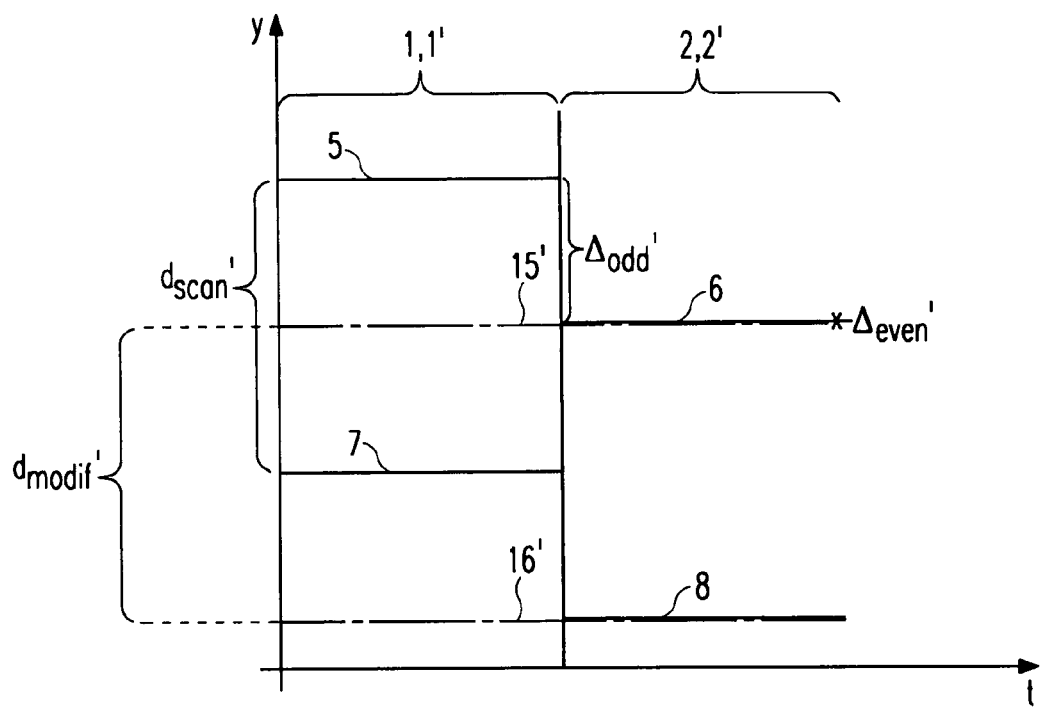
Figure 4:
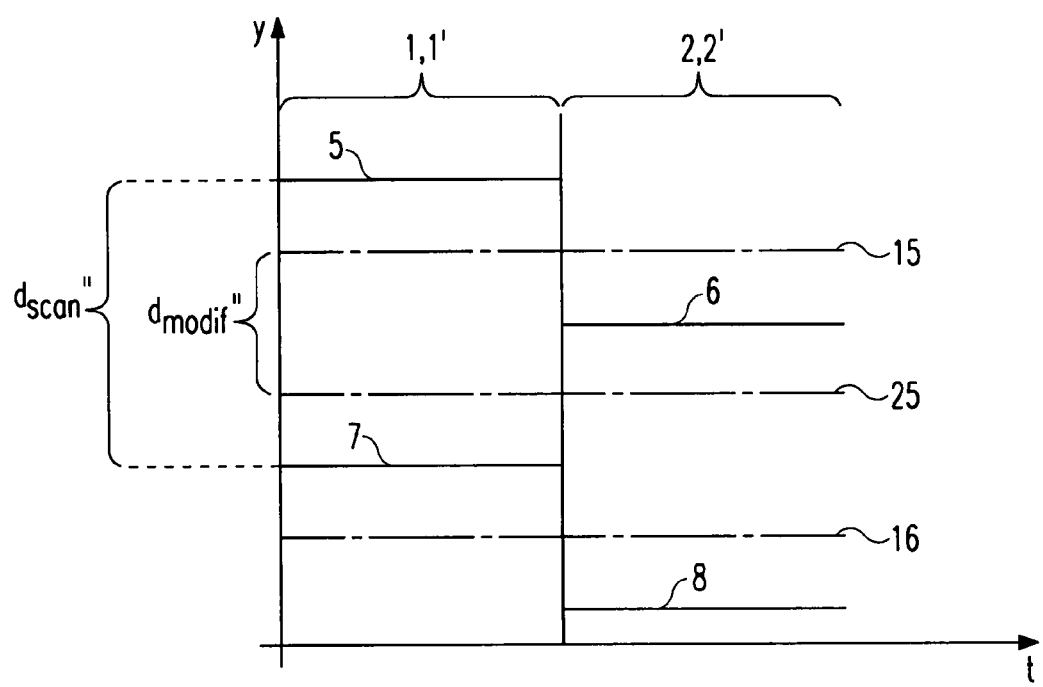
Figure 5:
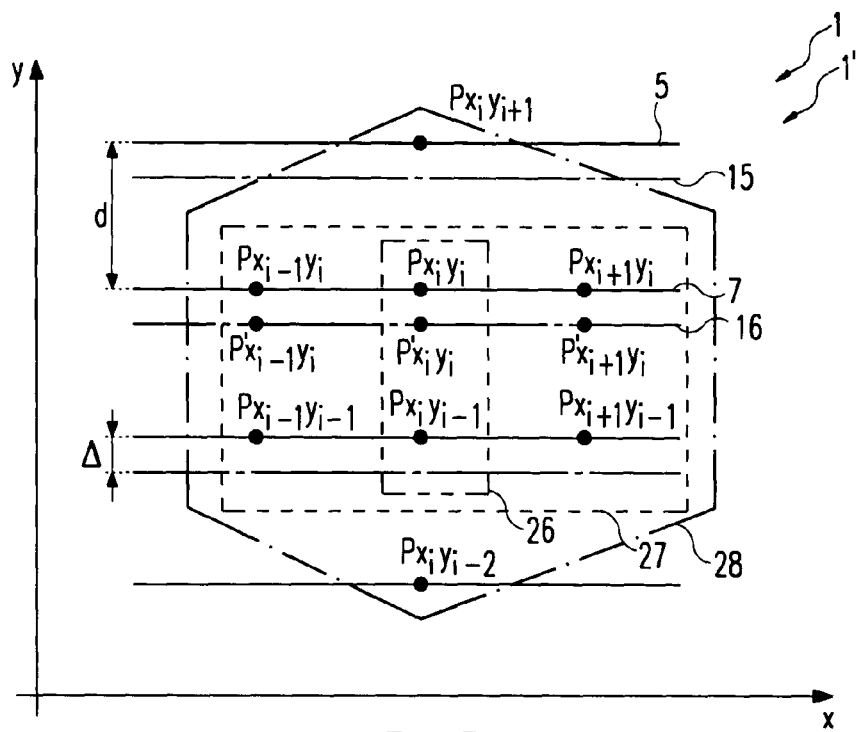
Figure 6:
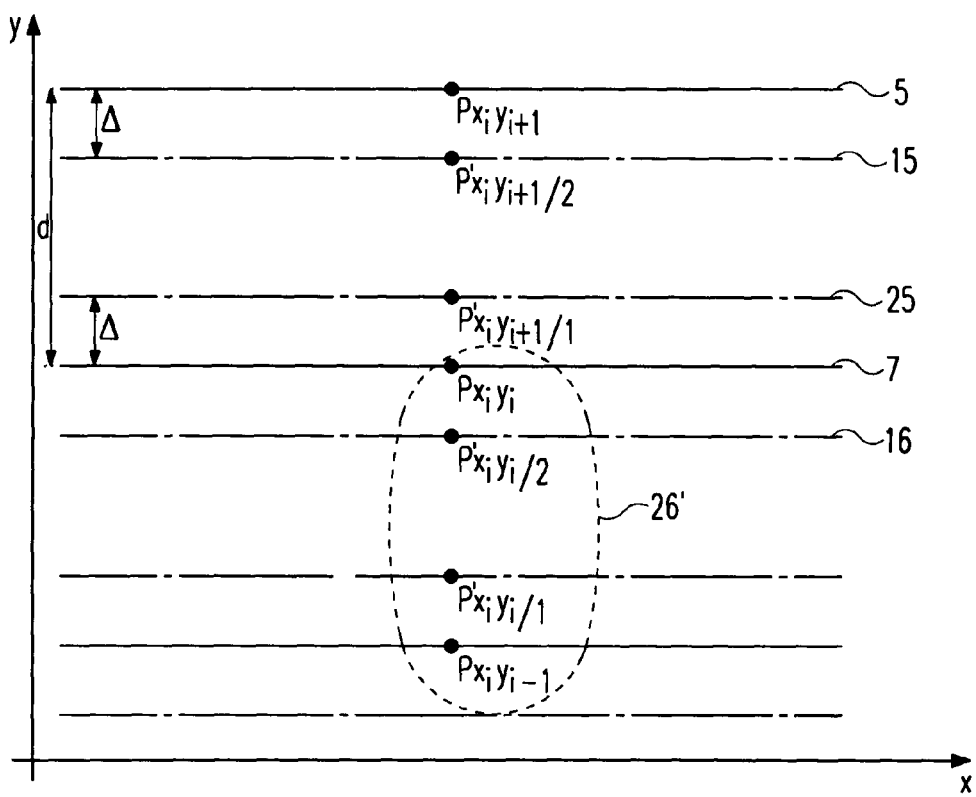
Figure 7:
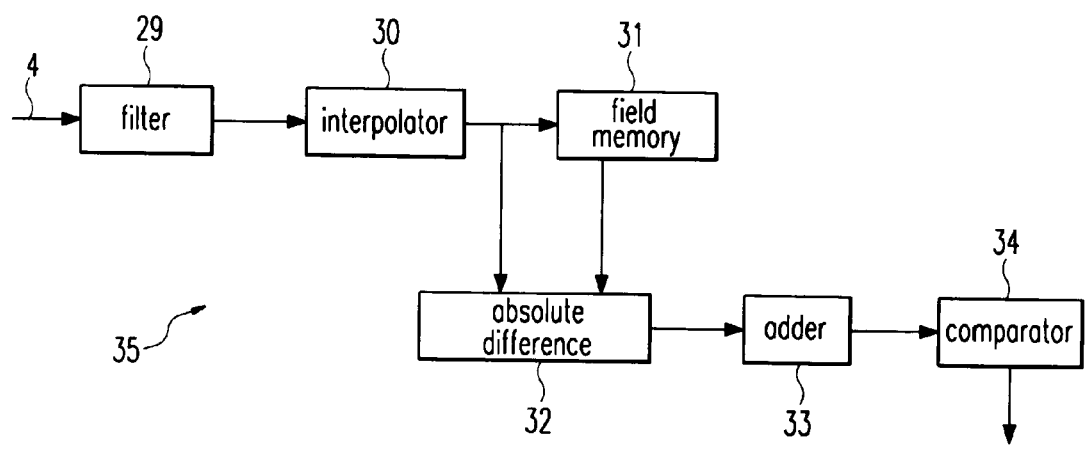

The features, objects, and advantages of the present invention will become more apparent from the detailed description set forth below when taken in conjunction with the drawings, wherein:

FIG. 1 shows the structure of an interlaced video material used by the invention, FIG. 2 shows how according to the present invention common raster lines can be generated for fields of different type, FIG. 3 shows common raster lines for fields of different type according to another embodiment of the present invention, FIG. 4 shows a further embodiment of common raster lines for fields of different type according to the present invention, FIG. 5 shows an interpolation according to an embodiment of the present invention, FIG. 6 shows an interpolation according to a further embodiment of the invention, and FIG. 7 is a schematic bloc diagram of a motion detection apparatus according to the invention.

DETAILED DESCRIPTION

The structure of a video containing a series of interlaced fields will now be described with reference to FIG. 1.

FIG. 1 shows a video sequence 1 comprising three successive interlaced fields 2, 3, 4. Each field 2, 3, 4 is a two dimensional area of pixels 9, 10, 11, 12, 13, 14 structured in scan lines 5, 6, 7, 8. The interleaved video sequence 1 is an alternative series of odd fields 1, 3 made up of odd scan lines 5, 7 and of even fields 2 made up of even scan lines 6, 8. In FIG. 1, the scan lines that are effectively used by the respective fields 2, 3, 4 are represented by a solid line while the inactive scan lines are represented by a dotted line.

Such a video sequence 1 may be for example an interleaved television signal. A conventional television signal comprising 525 scan lines at 30 Hz would thus consists in odd and even fields 1, 2, 3 at a repetition rate of 60 Hz. Each field 1, 2, 3 includes 262 or 263 odd or even scan lines which are separated by unilluminated strips or bands due to non-used or inactive pixels. An odd field 1, 3 thus comprises a number of 262 or 263 odd scan lines separated by inactive bands corresponding to the even scan lines used by the even fields 2. Successive fields 1, 2, 3 are offset so that the scan lines of the next field occupy the unilluminated strips of the present field.

In the following paragraphs it will be described with reference to FIGS. 2 to 4 how the structure of the original fields 1, 2, 3 of the interlaced video sequence 4 is modified according to the invention.

In order to perform a motion detection, a vertical translation movement is applied to the fields 1, 2, 3 of the interlaced video sequence 4 so as to generate modified fields 1', 2', 3' having their respective lines 15, 16 at the same vertical position y. The modified lines or raster lines 15, 16 of the new generated fields 1', 2', 3' are congruent, i.e. they are superposable so as to be coincident throughout.

FIG. 2 shows a vertical segment or area of the video sequence 4 comprising two pixels and the representation of this segment among three successive fields 1, 2, 3 and three successive modified fields 1', 2', 3' obtained by moving the scan lines 5, 6, 7, 8 of the fields 1, 2, 3. The modified raster lines 15, 16 of the modified fields 1', 2', 3' are common to the modified odd fields 1', 3' and to the modified even fields 2'.

According to the preferred embodiment of FIG. 2, the modified raster lines 15, 16 are equally distant from the scan lines 5, 7 of the odd fields 1, 3 and from the scan lines 6,8 of the even fields 2. This can be achieved by shifting up 24 the scan lines 6, 8 of one field type—the even field 2 in FIG. 2—and by shifting down the scan lines 5, 7 of the other field type—the odd field 1 in the embodiment of FIG. 2.

In FIG. 2 it has been defined a first distance $\Delta_{odd}$ between the modified raster lines 15, 16 of the modified odd fields 1', 3' and the respective nearest scan line 5, 7. Similarly a second distance $\Delta_{even}$ corresponds to the distance between the modified raster lines 15, 16 of the modified even fields 2' and the respective nearest scan line 6, 8. If $d_{scan}$ and $d_{modif}$ are the respective distance between two adjacent scan lines 5, 6, 7, 8 and between two adjacent modified raster lines 15, 16, the particular embodiment of FIG. 2 is characterized by the following equations:

$$d_{modif} = d_{scan}$$

$$\Delta_{odd} = d_{scan}/4$$

$$\Delta_{even} = d_{scan}/4$$

$$\Delta_{odd} + \Delta_{even} = d_{scan}/2$$

The modified raster lines 15, 16 are not necessarily equidistant from the scan lines 5, 6, 7, 8 of the different types of field. It is sufficient if said modified raster lines 15, 16 are congruent i.e. have the same vertical position y among the different field types.

Alternative embodiments are characterized by the fact that only the scan lines of one type of field are moved or translated while the structure of the other type of field is kept unamended to generate the modified field. In the example of FIG. 3 the modified raster lines 15', 16' correspond to the scan lines 6, 8 of the even fields 2 such that following equations are verified:

$$d_{modif}' = d_{scan}'$$

$$\Delta_{odd}' = d_{scan}'/2$$

$$\Delta_{even}' = 0$$

$$\Delta_{odd}' + \Delta_{even}' = d_{scan}/2$$

FIG. 4 shows an alternative embodiment wherein the number of modified raster lines 15, 16, 25 of the modified fields 1', 2', is greater than the number of scan lines of each odd or even field 1, 2. Preferably, a modified field 1', 2' comprises twice as many modified raster lines 15, 16, as the corresponding field 1, 2 and its scan lines 5, 6, 7, 8. The distance between two adjacent modified raster lines 15, 16, 25 is thus accordingly smaller than in the embodiments described above:

$$d_{modif}'' = d_{scan}''/2$$

In the following it will be described how the values of the different pixels of the modified fields 1', 2' are generated.

According to the invention, the modified fields 1', 2' are generated by interpolation of the respective field 1, 2 of the video sequence 4. Each field 1, 2 is in fact interpolated for generating the new data points or pixel values of the corresponding modified field 1, 2, that have a fixed position.

The invention performs a motion detection on the basis of the pixel values of two modified fields 1', 2' that are derived from two fields 1, 2 of different types. If the scan lines 5, 6, 7, 8 of both fields 1, 2 are translated to obtain said modified fields 1', 2' like in the embodiment of FIG. 2, each of both fields 1, 2 should be interpolated to compute new pixel values for the respective modified field 1', 2'. On the other hand if only the scan lines 5, 6, 7, 8 of one of both fields 1, 2 are translated to a position corresponding to the scan lines of the other field like in the embodiment of FIG. 3, only the field that have been translated needs to be interpolated.

FIG. 5 shows a part or area of the field 1 composed of scan lines 5, 7 and the same area of the modified field 1' composed of modified raster lines 15, 16. The line structure of the modified field 1' has been modified from the field 1 according to the embodiment presented in FIG. 2.

The field 1 comprises a set of pixels on each scan lines 5, 7, which are represented in FIG. 5 by their respective value $Px_iy_i$, wherein i is the position of the pixel within the $j^{th}$ scan line. The modified field 1' comprises an equal number of pixels referred to by their respective value $P'x_iy_i$. The distance between two adjacent scan lines 5, 7 or two adjacent modified raster lines 15, 16 is defined as being the value d, and $\Delta$ represents the smallest distance between a scan line 5, 7 and a modified raster lines 15, 16.

The interpolation that may be employed to generate the pixel values of the modified field 1' can belong to various known types of interpolation. The interpolation technique that may be used in the present invention has to be chosen according to the number of pixel values to be generated, the number and the position of the pixel values to interpolate, the cost of the interpolation technique in terms of processing time, and the smoothness of the results given by the interpolation technique.

In a first embodiment, it is proposed to use a linear interpolation generating a new pixel value on the basis of two surrounding or adjacent scan lines 5, 7. A simple example is the interpolation defined by following equation (the corresponding pixels of the field 1 are comprised in a dotted line 26 in FIG. 5):

$$P'x_iy_i = f1(Px_iy_i, Px_iy_{i-1}) = ((d-\Delta)*Px_iy_i + \Delta*Px_iy_{i-1})/d$$

wherein each pixel value of the modified field 1' depends on the value of the two closest pixels of the field 1. According to the embodiment of FIG. 2, it is verified that $\Delta = d/4$ and therefore:

$$P'x_iy_i = (3*Px_iy_i + Px_iy_{i-1})/4$$

In the embodiment of FIG. 3, the modified raster lines 15', 16' of the modified field 1' are obtained by translating the y coordinate of the scan lines 5, 7 by the value of half the distance between two adjacent scan lines 5, 7. It is thus verified that $\Delta = d/2$ and therefore the value of an interpolated pixel can be given by following equation:

$$P'x_iy_i = (Px_iy_i + Px_iy_{i-1})/2$$

Alternatively, the value $P'x_iy_i$ may depend on more pixel values of the two adjacent scan lines 5, 7, such as in the following example (see dotted line 27 in FIG. 5):

$$P'x_iy_i = f2\begin{pmatrix} Px_iy_i, & Px_iy_{i-1}, \\ Px_{i-1}y_i, & Px_{i-1}y_{i-1}, \\ Px_{i+1}y_i, & Px_{i+1}y_{i-1} \end{pmatrix}$$

In other embodiments, the interpolation may take into account additional pixel values of additional scan lines 5, 7. An interpolated pixel may e.g. be computed on the basis of four surrounding scan lines 5, 7 located in the vertical positions $y = y_{i+1}$, $y = y_i$, $y = y_{i-1}$, $y = y_{i-2}$, like in the following function (dotted line 28 in FIG. 5 shows the corresponding pixels of the field 1):

$$P'x_iy_i = f3(Px_iy_i, Px_iy_{i-1},$$

$$Px_{i-1}y_i, Px_{i-1}y_{i-1},$$

$$Px_{i+1}y_i, Px_{i+1}y_{i-1},$$

$$Px_iy_{i+1}, Px_iy_{i-2})$$

FIG. 6 shows the modified raster lines 15, 16 of the embodiment depicted in FIG. 4, wherein the number of modified raster lines 15, 16 is superior to and preferably twice the number of scan lines of the field 1. To each pixel $Px_iy_i$ of the field 1 correspond two interpolated pixels of the modified field 1' $P'x_iy_{i/1}$ and $P'x_iy_{i/2}$.

The interpolation described above with respect to FIG. 5 can be applied to determine the new pixels values $P'x_iy_{i/1}$ and $P'x_iy_{i/2}$. Specifically, the interpolation may generate new pixels values of the modified raster lines 15, 16, 25 on the basis of the two surrounding scan lines 5, 7 (see dotted line 26' in FIG. 6):

$$P'x_iy_{i/1} = f1_{/1}(Px_iy_i, Px_iy_{i-1}) = (\Delta*Px_iy_i + (d-\Delta)*Px_iy_{i-1})/d$$

$$P'x_iy_{i/2} = f1_{/2}(Px_iy_i, Px_iy_{i-1}) = ((d-\Delta)*Px_iy_i + \Delta*Px_iy_{i-1})/d$$

with d the distance between the two surrounding scan lines 5, 7 and $\Delta$ the distance between a modified raster lines 15, 16, 25 and the nearest scan line 5, 7.

According to other embodiment of the invention, other interpolation methods like polynomial interpolation may be used.

FIG. 7 shows an example of a schematic block diagram of a motion detection apparatus 35 according to the present invention.

The motion detection apparatus 35 is operable to receive and process the successive fields 1, 2, 3 of the video sequence 4. The fields 1, 2, 3 are preferably first fed to a filter 29 that is designed to low-pass filter video data. The filter video signal is then sent to an interpolator 30. It has to be noted that the filter 29 may be additionally or alternatively included in said interpolator 30.

The interpolator 30 receives a field 1, 2, 3 of the video sequence 4 as an input and generates at an output a modified field 1', 2', 3'. The field 1, 2, 3 is interpolated according to the above description to generate the modified raster lines 15, 16 and the corresponding pixel values of the modified fields 1', 2', 3'.

A field memory 31 is provided to store temporarily the modified field generated by the interpolator 30. The respective outputs of the interpolator 30 and the field memory 31 are preferably two successive modified fields 1', 2', 3' corresponding to two fields 1, 2, 3 of different type. The field memory 31 may also be operable to store a given modified field over a longer period of time such that it would be possible to perform a motion detection for two non-successive fields of the video sequence 4.

The outputs of the interpolator 30 and the field memory 31 are fed or input to a unit 32 designed to compute an absolute difference for each pixel position. The unit 32 in fact selects a given same set of pixels from the two input fields, which reflects a given area of the input fields, and calculates the absolute difference between two corresponding pixels of the two selected set of pixels.

The absolute difference is computed for each pixel of the selected set of pixels and added by an adder 33. The sum output by the adder is then compared by a comparator 34 to a predefined threshold value for decision. If said sum is below the threshold, the comparator 34 generates a signal indicating that no motion can be detected between the two fields. If said sum is superior to the threshold, a motion has been actually detected between the two fields and the comparator 34 generates a corresponding signal.

The invention claimed is:

1. A method for a motion detection in an interlaced field sequence, comprising:
    selecting two initial fields from the interlaced field sequence, each of said two initial fields having different scan lines, interpolating each of said two initial fields to generate two respective new fields, said new fields having raster lines that are congruent, a number of the raster lines being larger than a number of the scan lines, generating a value of a pixel of each new field using pixel values of at least two scan lines of a corresponding initial field of the interlaced field sequence, the initial field surrounding said pixel, and performing a motion detection based on the new fields; and
    obtaining a first set of raster lines by shifting up scan lines of one initial field by half a distance between two scan lines and obtaining a second set of raster lines by shifting down the same scan lines the initial field by half of said distance between two scan lines.

2. The method according to claim 1, wherein the initial fields are two consecutive fields of the interlaced field sequence.

3. The method according to claim 1, wherein a number of the raster lines of each of said two new fields is at least equal to a number of the scan lines of each of said initial fields.

4. The method according to claim 1, wherein each raster line corresponds to a vertical translation of a corresponding scan line.

5. The method according to claim 1, wherein the interpolating comprises:
    performing a linear interpolation.

6. The method according to claim 1, said performing a motion detection comprising:
    comparing a same area of said new fields.

7. The method according to claim 6, further comprising:
    calculating, for each pixel of the same area, a difference between a pixel value of said new fields;
    generating a motion parameter by adding said calculated difference for all pixels of the same area; and
    performing said motion detection based on the motion parameter.

8. The method according to claim 7, further comprising:
    comparing the motion parameter to a predetermined threshold.

9. The method according to claim 1, further comprising:
    filtering the two initial fields.

10. A computer readable, non-transitory medium containing instructions configured to cause a computing device to implement the method of claim 1.

11. The method according to claim 1, further comprising one of:
    performing a video scene analysis;
    performing a video compression; and
    displaying a video.

12. A method for a motion detection in an interlaced field sequence, comprising:
    selecting two initial fields from the interlaced field sequence, said two initial fields having different scan lines;
    generating two new fields, including generating one of said two new fields using one of said two initial fields and generating the other of said two new fields by interpolating the other of said two initial fields, said two new fields each having raster lines that are congruent a number of the raster lines being larger than a number of the scan lines;
    generating a value of a pixel of each new field using pixel values of at least two scan lines of a corresponding initial field of the interlaced field sequence, the initial field surrounding said pixel, and performing a motion detection based on the two new fields; and
    obtaining a first set of raster lines by shifting up scan lines of one initial field by half a distance between two scan lines and obtaining a second set of raster lines by shifting down scan lines of the same initial field by half of said distance between two scan lines.

13. The method according to claim 12, wherein the two initial fields are two consecutive fields of the interlaced field sequence.

14. The method according to claim 12, wherein a number of the raster lines of each of said two new fields is at least equal to a number of scan lines of each of said two initial fields.

15. The method according to claim 12, wherein each raster line corresponds to a vertical translation of a corresponding scan line.

16. The method according to claim 12, wherein the generating the two new fields comprises:
    performing a linear interpolation.

17. The method according to claim 12, said performing comprising:
    comparing a same area of said new fields.

18. The method according to claim 17, further comprising:
    calculating, for each pixel of the same area, a difference between a pixel value of said two new fields;
    generating a motion parameter by adding said difference calculated for all pixels of the same area; and performing said motion detection based on the motion parameter.

19. The method according to claim 18, further comprising: comparing the motion parameter to a predetermined threshold.

20. The method according to claim 12, further comprising: filtering the initial fields.

21. A computer readable, non-transitory medium containing instructions configured to cause a computing device to implement the method of claim 12.

22. The method according to claim 12, further comprising one of:
performing a video scene analysis;
performing a video compression; and
displaying a video.

23. A system for a motion detection in an interlaced field sequence, comprising:
an interpolating unit configured to generate two new fields having congruent raster lines based on two initial fields of the interlaced field sequence, said two initial fields each having non-congruent scan lines;
a field memory adapted to store at least one of the two new fields; and
a motion detector configured to detect a motion based on the two new fields, wherein said interpolating unit is adapted to generate a value of a pixel of each new field using pixel values of at least two non-congruent scan lines of a corresponding initial field of the interlaced field sequence, said new field having raster lines that are congruent, the initial field surrounding said pixel, a number of the raster lines being larger than a number of the scan lines;
wherein said interpolating unit is adapted to generate a first set of raster lines by shifting up scan lines of an initial field by half a distance between two scan lines and to generate a second set of raster lines by shifting down the same scan lines of the initial field by half said distance between two scan lines.

24. The system according to claim 23, wherein said interpolating unit is configured to generate said two new fields such that a number of congruent raster lines of said two new fields is at least equal to a number of the non-congruent scan lines of said two initial fields.

25. The system according to claim 23, wherein said interpolating unit is adapted to generate said two new fields having said congruent raster lines by performing a vertical translation of the two non-congruent scan lines.

26. A system for a motion detection in an interlaced field sequence, comprising:
a selecting unit configured to select two initial fields from the interlaced field sequence, said two initial fields having different scan lines, a generator having an interpolating unit configured to generate two new fields, one of said two new fields generated using one initial field and another of said two new fields generated based on another initial field, wherein said two new fields each have raster lines that are congruent, a number of the raster lines being larger than a number of the scan lines, said interpolating unit is adapted to generate a value of a pixel of each new field using pixel values of at least two non-congruent scan lines of a corresponding initial field of the interlaced field sequence, the initial field surrounding said pixel, a field memory adapted to store at least one of the two new fields, and a motion detection unit configured to perform a motion detection based on the two new fields;
wherein said interpolating unit is adapted to generate a first set of raster lines by shifting up scan lines of an initial field by half a distance between two scan lines and to generate a second set of raster lines by shifting down the same scan lines of the initial field by half of said distance between two scan lines.

27. The system according to claim 26, wherein said interpolating unit is such that a number of raster lines of said two new fields is at least equal to a number of scan lines of said two initial fields.

28. The system according to claim 26, wherein said interpolating unit is adapted to generate said raster lines by performing a vertical translation of the two scan lines.

29. A system for a motion detection in an interlaced field sequence, comprising:
an interpolating unit configured to generate two new fields having congruent raster lines based on two initial fields of the interlaced field sequence, said two initial fields each having non-congruent scan lines, and a motion detector configured to detect a motion based on the two new fields, wherein said interpolating unit is adapted to generate a value of a pixel of each new field using pixel values of at least two non-congruent scan lines of a corresponding initial field of the interlaced field sequence, said new fields having raster lines that are congruent, the initial field surrounding said pixel, a number of the raster lines being larger than a number of the scan lines;
wherein said interpolating unit is adapted to generate said two new fields having said congruent raster lines by shifting up a non-congruent scan line of one initial field by half a distance between two scan lines and by shifting down the same scan line initial field by half of said distance between two scan lines.

30. The system according to claim 29, wherein said motion detector is adapted to compare a same area of said new fields.

31. The system according to claim 30, further comprising:
a calculating unit configured to calculate, for each pixel of the same area a difference between pixel values of said new fields;
an adder configured to generate a motion parameter by adding said difference calculated for all pixels of the same area; and
a determination unit configured to detect said motion based on the motion parameter.

32. The system according to claim 31, further comprising:
a comparator configured to compare the motion parameter to a predetermined threshold.

33. The system according to claim 29, further comprising:
a filter configured to filter the initial fields.

34. A system for a motion detection in an interlaced field sequence, comprising:
a selecting unit configured to select two initial fields from the interlaced field sequence, said two initial fields having different scan lines, a generator having an interpolating unit configured to generate two new fields, one of said two new fields generated using one initial field and another of said two new fields generated based on another initial field, wherein said two new fields each have raster lines that are congruent, a number of the raster lines being larger than a number of the scan lines, and a motion detection unit configured to perform a motion detection based on the two new fields, wherein said interpolating unit is adapted to generate a value of a pixel of each new field using pixel values of at least two scan lines of a corresponding initial field of the interlaced field sequence, the initial field surrounding said pixel; and obtaining a first set of raster lines by shifting up scan lines of one initial field by half a distance between two scan lines and obtaining a second set of raster lines by shifting down the same scan lines by the initial field by half of said distance between two scan lines.

35. The system according to claim 34, wherein said interpolating unit is adapted to perform a linear interpolation.

36. The system according to claim 34, wherein said motion detection unit is adapted to compare a same area of said two new fields.

37. The system according to claim 36, said motion detection unit comprising:
   a calculating unit configured to calculate, for each pixel of the same area, a difference between pixel values of said two new fields,
   an adder configured to generate a motion parameter by adding said difference calculated for all pixels of the same area; and
   a determination unit configured to perform said motion detection based on the motion parameter.

38. The system according to claim 37, further comprising:
   a comparator configured to compare the motion parameter to a predetermined threshold.

39. The system according to claim 34, further comprising:
   a filter configured to filter the two initial fields.

* * * * *